US 7,007,185 B2

(12) United States Patent
Kano et al.

(10) Patent No.: US 7,007,185 B2
(45) Date of Patent: *Feb. 28, 2006

(54) INFORMATION STORAGE APPARATUS INCLUDING AN UNINTERRUPTIBLE POWER SUPPLY (UPS) AND AN INTERLOCK CONTROL METHOD OF THE SAME

(75) Inventors: Azuma Kano, Odawara (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/843,482

(22) Filed: May 12, 2004

(65) Prior Publication Data

US 2004/0210784 A1    Oct. 21, 2004

Related U.S. Application Data

(63) Continuation of application No. 10/096,455, filed on Mar. 13, 2002, now Pat. No. 6,757,835, which is a continuation of application No. 09/287,376, filed on Apr. 7, 1999, now Pat. No. 6,389,546.

(30) Foreign Application Priority Data

Apr. 20, 1998 (JP) ................................. 10-109331

(51) Int. Cl.
   *G06F 1/32*    (2006.01)
   *G06F 1/26*    (2006.01)
(52) U.S. Cl. ........................................ 713/340; 714/22
(58) Field of Classification Search ................ 713/300, 713/310, 330, 340; 711/114

See application file for complete search history.

(56) References Cited

U.S. PATENT DOCUMENTS

| 5,524,203 | A | * | 6/1996 | Abe ................................ 714/6 |
| 5,748,874 | A | | 5/1998 | Hicksted et al. ............. 713/340 |
| 5,889,933 | A | | 3/1999 | Smith ............................ 714/22 |
| 6,041,414 | A | | 3/2000 | Kikuchi ........................ 713/300 |
| 6,389,546 | B1 | | 5/2002 | Kano et al. |
| 6,757,835 | B1 | * | 6/2004 | Kano et al. ................. 713/340 |

FOREIGN PATENT DOCUMENTS

JP            8297530         11/1996

* cited by examiner

*Primary Examiner*—Glenn A. Auve
(74) *Attorney, Agent, or Firm*—Mattingly, Stanger, Malur & Brundidge, P.C.

(57) ABSTRACT

In an information storage apparatus including an uninterruptible power supply (UPS), a sequence of operation from when a power failure occurs to when power of the UPS is turned off is automatically accomplished completely without human power to thereby guarantee user data. For this purpose, the apparatus includes a disk array, a host, and a plurality of UPSs to supply power to the disk array and the host. The UPSs monitor a state change of power on a host side by a host ac control line or an SCSI unit to sequentially execute processing in an order of processing of host termination, processing for cache flush of the disk array processing of host UPS termination processing of disk array termination and processing for termination of disk array UPS. Between the UPSs and the Host and between the UPSs and the disk array, there is provided an interlocking control signal to monitor current states thereof so as to control the respective operations. Resultantly the host UPS and the disk array UPS have the same configuration for wider usability.

5 Claims, 4 Drawing Sheets

INFORMATION STORAGE APPARATUS INCLUDING AN UNINTERRUPTIBLE POWER SUPPLY (UPS) AND AN INTERLOCK CONTROL METHOD OF THE SAME

The present application is a continuation of application Ser. No. 10/096,455, Mar. 13, 2002, now U.S. Pat. No. 6,757,835; which is a continuation of application Ser. No. 09/287,376, filed Apr. 7, 1999, now U.S. Pat. No. 6,389,546, the contents of which are incorporated herein by reference.

BACKGROUND OF THE INVENTION

The present invention relates to an information storage apparatus including a disk array including a disk drive and a cache (volatile memory), a host, an uninterruptible power supply (UPS) for the disk array, and a UPS for the host and a control method of the same.

In a system configuration of an information storage apparatus including a disk array including a disk drive and a cache, a host, a UPS for the disk array, and a UPS for the host, when a power failure occurs, there is required, there is required a procedure to guarantee user data as follows.

Occurrence of Power Failure

① Processing of host termination and cash flush of the disk array (to write data of the cache in the disk drive) and setting of the system to a write-through mode (to inhibit use of the cache).
② Recognition of completion of host termination
③ Processing of host UPS termination
④ Processing of disk array termination
⑤ Recognition of completion of disk array termination
⑥ Processing of termination of disk array UPS.

JP-A-8-297530 describes a technology related to the operations above.

In accordance with the technology of the publication above, only processing on the host side of ① and operations of ② and ③ can be automatically accomplished. However, the processing on the disk array side of ① and operations of ④ to ⑥ are disadvantageously required to be carried out by human power. That is, when a power failure occurs on the host side, only the termination processing is required to be immediately executed; whereas, on the disk array side, the termination processing is carried out only after data of the host side are entirely received. Therefore, the termination must be achieved after the completion of the host termination is recognized and this restriction results in a difficulty.

SUMMARY OF THE INVENTION

It is therefore an object of the present invention to provide an interlock control method for each of the operations of ④ to ⑥ between the host, the disk array, and the uninterruptible power supplies to thereby automatically conduct the overall operations including the operation on the disk array side of
① without any intervention of human power so as to guarantee user data.

Furthermore, another object of the present invention is to provide an interlock control method for wider usability in which the operation between the disk array and the UPS and that between the host and the UPS are related to each other in the same control method. Consequently, it is possible to control the disk array and the host by the UPSs of the same configuration.

To achieve the objects above in accordance with the present invention, there is provided a method as follows.

The uninterruptible power supplies monitor a state change of the host-side power from on to off to sequentially execute processing in an order of the processing of host termination, cache flush processing of the disk array, the processing of host UPS termination, the processing of disk array termination, and the processing of disk array UPS termination.

Additionally, between the host UPS and the host and between the disk array UPS and the disk array, there is provided an interlock control signal to monitor the respective current states so as to mutually control respective operations. Consequently, the host UPS and the disk array UPS advantageously have the same configuration for wider usability.

Moreover, a single UPS to supply power to the disk array and to the host monitors the state change of the power on the host side from on to off by a Small Computer Systems Interface (SCSI) interface (I/F) or unit establishing a connection between the host and the disk array to sequentially accomplish processing in an order of the processing of host termination, the processing of cache flush of the disk array, the processing of disk array termination, and the processing of UPS termination.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
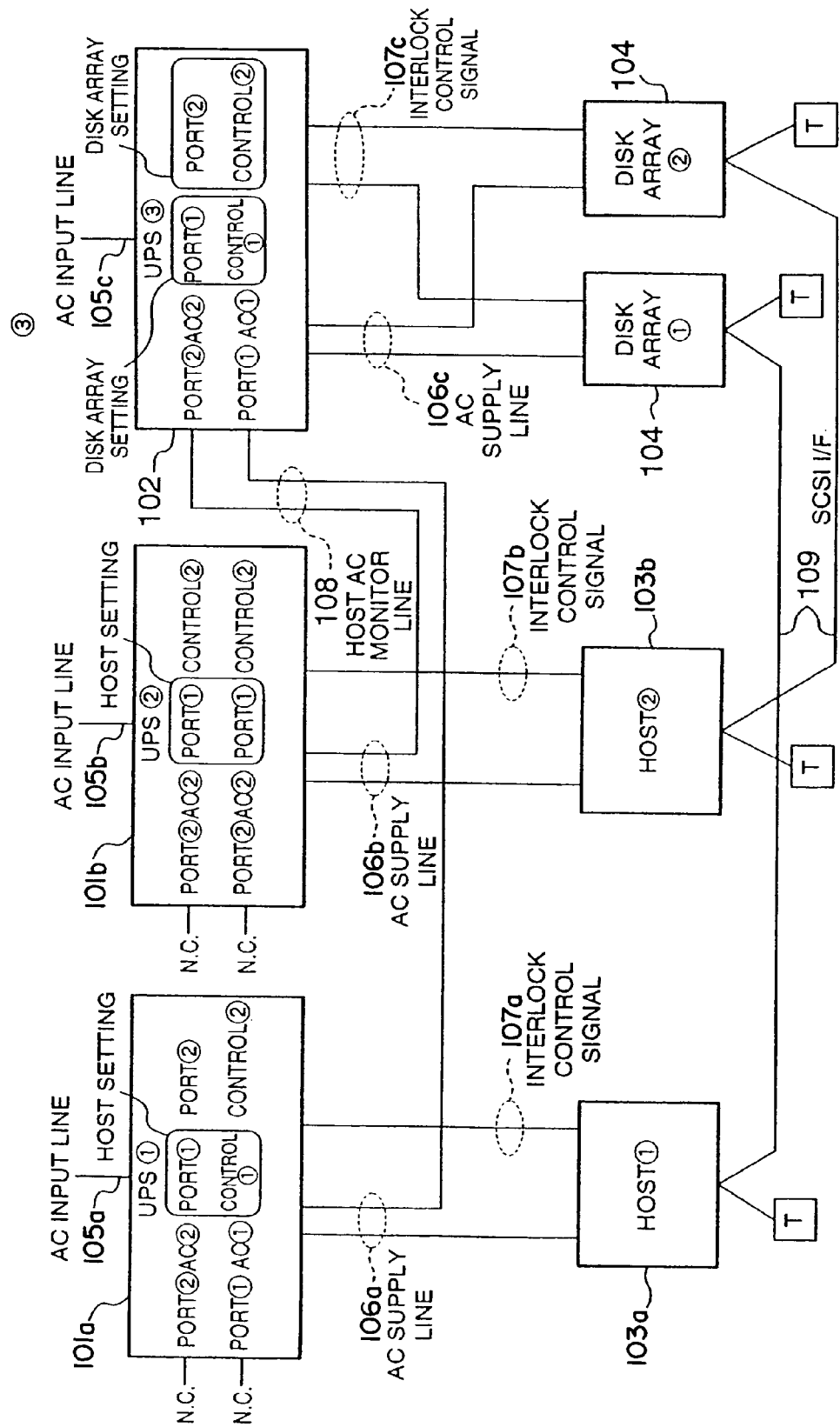
FIG. 1 is a diagram schematically showing an overall construction of an embodiment in accordance with the present invention.
Figure 2:
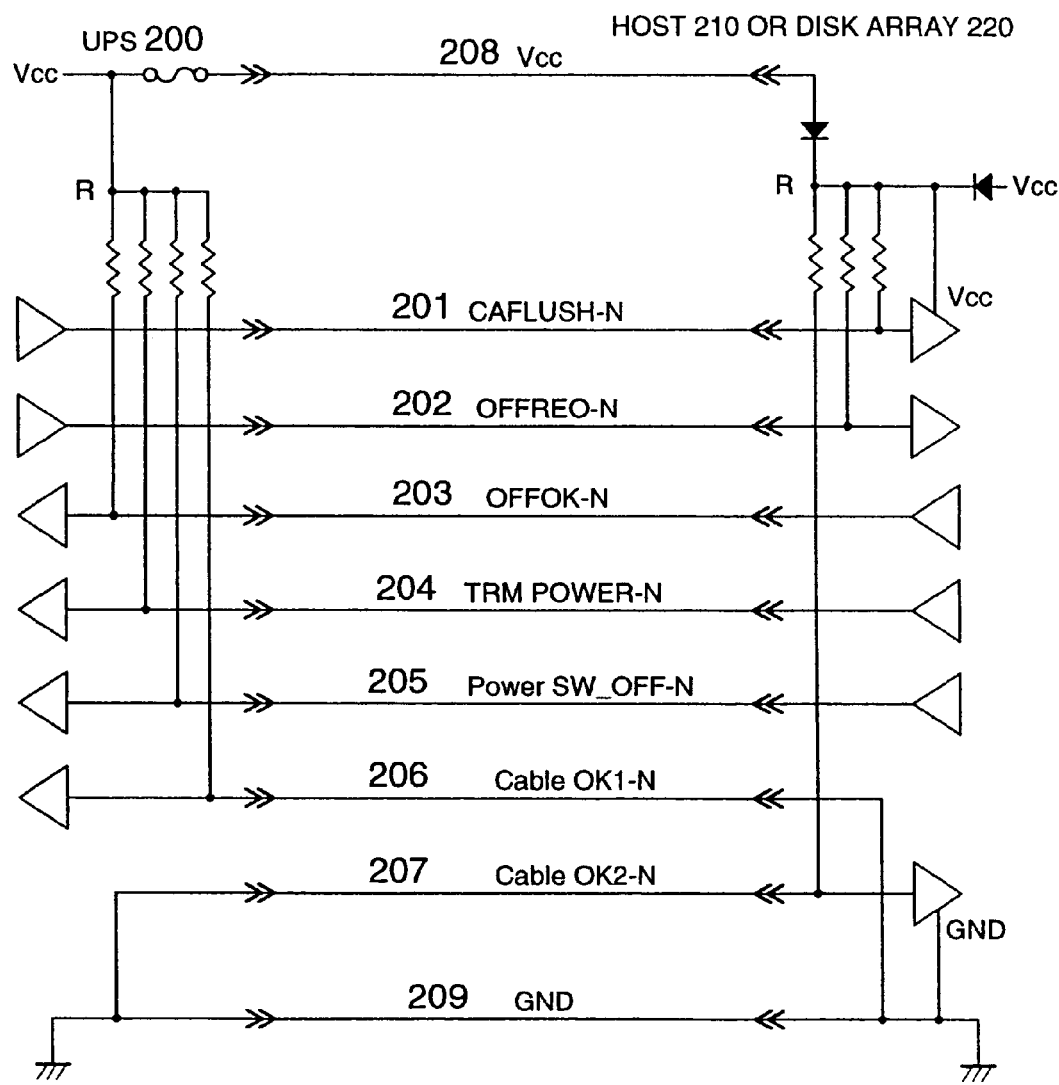
FIG. 2 is a diagram showing connections of interlock control signals between a UPS and the host and between a UPS and the disk array.
Figure 3:
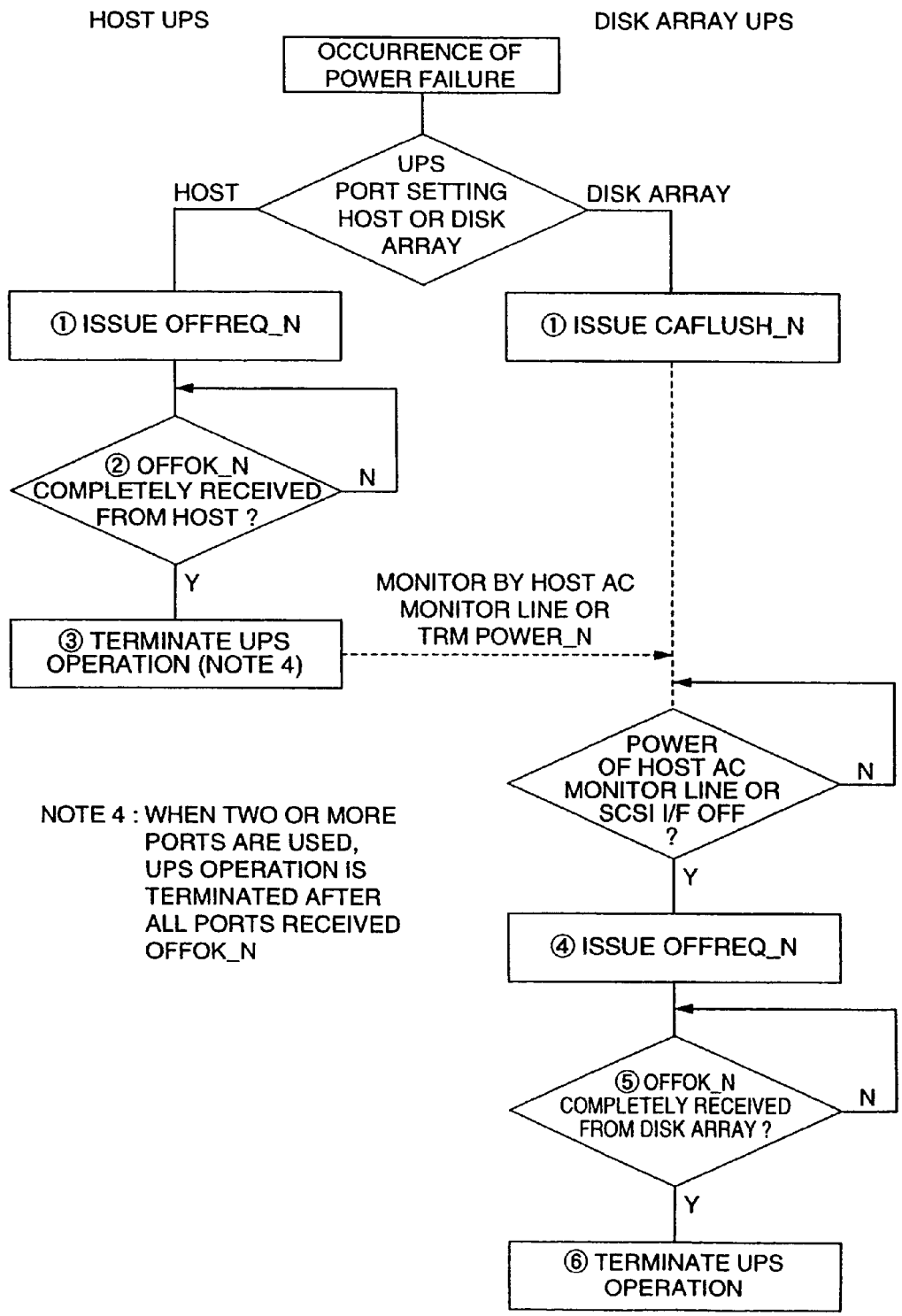
FIG. 3 is a flowchart showing a procedure of the host UPS and the disk array UPS at a power failure.

Referring now to FIGS. 1 to 3, description will be given of an embodiment in accordance with the present invention. FIG. 1 shows an overall configuration of an embodiment of the present invention.

FIG. 1 shows the various components labeled a, b and c. The components labeled (a) relate to Host (1) and UPS (1), the components labeled (b) relate to Host (2) and UPS (2) and the components labeled (c) relate to the disk array. However, for ease of illustration, the following discussion may generically refer to the components.

The configuration of the embodiment includes an uninterruptible power supply (to be referred to as UPS herebelow) (UPS ① and UPS ②) 101, a disk array UPS (UPS ③) 102, at least one host 103, and at least one disk array 104. The host UPS 101 and the disk array UPS 102 each include an alternating current (ac) input line 105 and respectively supply power to the host 103 and the disk array 104 via Ac supply lines 106, respectively. Moreover, between the host UPS 101 and the host 103 and between the disk array UPS 102 and the disk array 104, there is provided an interlock control signal 107 to control operation therebetween. However, the disk array UPS 102 is connected to two disk arrays ① 104 and ② 104 respectively via a port ① and a port ② and hence there are employed two control signals, i.e., control ① and control ②.

Moreover, in order for either one of the disk array UPS 102 and the disk array 104 to monitor a state of power of the host 103, there are provided two means. One means is a host ac monitor line 108, which also includes a line from the UPS ① and a line from the UPS ② for discrimination between two host UPSs 101, i.e., UPS ① and UPS ②. The other means is an SCSI I/F or unit 109 connecting the host 103 to the disk array 104, which also includes a line from the host ① and a line from the host ②.

In this connection, the present embodiment includes two means of the host ac monitor line 108 and the SCSI I/F 109. However, the operation above can also be achieved by using at least either one thereof.

In this embodiment there are utilized as an example two hosts 103, two disk arrays 104, and three UPSs, i.e., UPSs 101 and 102. Three UPSs, i.e., UPSs 101 and 102 are of the same internal configuration and are also the same with each other in external connection modes. Therefore, the UPSs can be connected to the host 1 as well as to the disk array 104, namely, the configuration of the UPSs leads to wider usability. However even when there is employed a UPS 101 including only one control port there occurs no problem from a viewpoint of the interlock control.

Description will now be given of functions of the UPSs 101 and 102 and the connection lines thereof. In the UPS 101 and 102, each of the ports is set to the host 103, the disk array 104, or to a disable state. For example, in the UPS ①, a host setting is conducted to connect a port ① control ① to the host ①. The ac input line occupies one port and is used for the host and disk array UPSs.

The host monitor line 108 is an input line which occupies two ports and which monitors the power state of the ac line of the host 103 to establish a chance of initiation of a planned or programmed termination of the disk array, and only a voltage of the line is assumed to be monitored (when the disk array 104 including the disk drive and the data cache is to be stopped or terminated, it is essential to conduct a cache flush to write dirty data of the cache memory on a disk (not shown) of the disk array 104 Therefore, when the apparatus is to be stopped, there is required a sequence in which the cache flush is completed and then the power of the apparatus is turned off. The procedure to automatically accomplish the sequence is called "planned or programmed termination").

However each line has a function of "Disable" (not connected (NC)). In a case in which the port is set to a host and the host ac monitor line 108 is set to Disable, when there is detected a voltage of the ac input which is equal to or less than a predetermined voltage for a period of time equal to or more than a predetermined period of time, there is unconditionally started processing of a shutdown (programmed termination) by an interlock control signal. In any other cases, when the port detects a voltage which is equal to or less than the predetermined voltage for a period of time equal to or more than a predetermined period of time, there is started processing of a shutdown (programmed termination) for the disk array 104 connected to the port. Additionally, the ac supply line 106 occupies two ports and serves as a power output line for each of the host UPS 101 and the disk array UPS 102 and is controlled by the host ac monitor line 108 and the interlock control signal 107.

Furthermore, the interlock control signal 107 occupies two ports and the host UPS 101 and the disk array UPS 102 respectively have functions to notify a chance of initiation of the shutdown processing (programmed termination) respectively to the host 103 and the disk array 104 and functions to recognize completion of the shutdown processing (programmed termination) of each of the host 103 and the disk array 104. Additionally, when the port setting is conducted for the disk array 104, the signal 107 has a function to supply a chance for the cache flush and the write-through mode. This interlock control signal includes a function to detect a state of a terminator power signal in the SCSI I/F 109. Details of the interlock control signal 107 will be described by referring to FIG. 2.

Next, description will be given of an outline of procedure automation ranging from an occurrence of power failure to the processing of termination of the disk array UPS 102.

Occurrence of Power Failure

① Processing for termination of the host 103 (host ① and host ②), the cache flush of the disk array 104, and transfer of control to the write-through mode.

② Recognition of completion of termination of the host 103 (hosts ① and ②).

③ Processing for termination of the host UPS 101 (UPSs ① and ②).

④ Processing for termination of the disk array 104 (disk arrays ① and ②).

⑤ Recognition of completion of termination of the disk array 104 (disk arrays ① and ②).

⑥ Processing for termination of the disk array UPS 102 (UPS ③).

Procedure ①

When a power failure occurs, the port ① of the UPS 101 (UPSs ① and ②) of the host setting unconditionally initiates shutdown processing of the host 103 (hosts ① and ② by an interlock control signal. Details of the interlock control will also be described later in conjunction with explanation of FIG. 2.

On the other hand, for the ports ① and ② of the UPS 102 (UPS ③) of which the host ac monitor line 108 is set to Enable, since both of the lines of the host ac monitor line 108, i.e., a line to the UPS ① and a line to the UPS ② are powered the cache flush and the write-through mode are initiated.

Procedure ②

When the shutdown processing is completed, the host 103 (hosts ① and ②) immediately reports the completion of host termination to the UPS 101 (UPSs ① and ②) by an interlock control signal.

Procedure ③

On receiving a report of completion of the host termination from the host 103 (hosts ① and ②), the UPS 101 (UPS ① and UPS ②) is stopped.

Procedure ④

When a voltage which is equal to or less than a predetermined voltage and which continues for a period of time equal to or more than a predetermined period of time is recognized in both of the power sources of the host ac monitor line 108, i.e., ac ① connected to the UPS ① and ac ② connected to the UPS ② or when a terminator power of the SCSI I/F 109 including means capable of recognizing the completion of host termination is interrupted the interlock control signal 107 initiates the shutdown processing (programmed termination) of the disk array 104 (disk array ① and disk array ②). In this case, it is only necessary to use the host ac monitor line 108 or the terminator power of the SCSI IFEATURES 109. However, the selection for utilization thereof depends on the Enable or Disable setting for the ac monitor line 108 and TRM POWER-N, which will be described later.

Procedure ⑤

When the programmed termination is completed, the disk array (disk arrays ① and ②) immediately reports by the interlock control signal 107 the completion of disk array termination to the UPS 102 (UPS ③).

Procedure ⑥

On receiving a report of the completion of disk array termination from the disk arrays 104 at both ports (disk arrays ① and ②), the UPS 102 (UPS ③) terminates its own operation.

Subsequently, description will be given in detail of the interlock control between the UPS and the host or between the UPS and the disk array. FIG. 2 shows connections of interlock control signals 201 to 209 between the UPSs 101 and 102 (UPS 200 in this diagram) and the host 103 (host 210 in this diagram) as well as the disk array 104 (disk array 220 in this diagram) shown in FIG. 1. In this diagram, numerals 201 to 203 indicate control signals between the host 210 or the disk array 220 and the UPS 200, numerals 204 to 207 designate status signals, and numerals 208 and 209 respectively indicate a power source and a grounding potential.

"CAFLUSH-N" 201 is a signal outputted from the UPS 200 to request the disk array 220 for the cache flush and the state transition to the write-through mode. "OFFREQ-N" 202 is a signal outputted from the UPS 200 to request the host 210 or the disk array 220 to turn power off. Moreover, "OFFOK-N" 203 is an input signal to the UPS 200 and indicates that the host 210 or the disk array 220 stops the processing of termination. The signal 203 permits the UPS 200 to turn power off. When an OFFOK signal is inputted to each port in the Enable state, the UPS 200 immediately turns power off regardless of the state of CAFLUSH/OFFREQ.

In addition, "TRM POWER-N" 204 is a signal inputted to the UPS 200. This signal is an OR signal obtained by ORing all signals of the terminator power line of SCSI.

However, the signal 204 has a "disable" function. In an interlock control mode related to the SCSI terminator power line, when this signal is used to start supplying power to the ac supply line of the UPS 200, the UPS 200 must not monitor the signal line thereafter. In other words, when this signal is negated after the power supplying operation is started, the ac supply line is kept retained. The ac supply line is interrupted only in response to assertion of OFFOK.

Furthermore, "Power SW-OFF-N" 205 is an input signal to the UPS 200 and indicates that a main switch of the host 210 or the disk array 220 is on. "Cable OK1-N" 206 is an input signal to the UPS 200, and this signal line is connected to a ground potential (GND) in the host 210 or the disk array 220. The UPS 200 raises the voltage of the signal line. When this signal is at a Low level, the UPS 200 recognizes normality of cable connection. Additionally, "Cable OK2-N" 207 is an output signal from the UPS 200 and its signal line is connected to a ground potential (GND) in the host 210 or the disk array 220. The UPS 200 increases a potential of the signal line. When the signal is at a Low level, the UPS 200 recognizes normality of cable connection.

Moreover, "Vcc" 208 as the power source is outputted from the UPS 200 and is continuously supplied to the host or the disk array "GND" 209 is a ground (GND) signal for the ground potential.

FIG. 3 shows a flow of procedures of the UPSs 101 and 102 respectively on the side of host 103 and on the side of disk array 104 at power failure. When a power failure occurs, each port of the host UPS 101 and the disk array UPS 102 recognizes that the port is connected to the host 103 or the disk array 104 in accordance with the port setting of each UPS (UPSs ①, ②, and ③ of FIG. 1 are indicated as the host setting, the host setting, and the disk array setting, respectively).

The host UPS 101 immediately issues "OFFREQ-N" 202 to the host to start the shutdown processing of the host 103 (this corresponds to the procedure ① after occurrence of the power failure above). When "OFFK-N" 203 indicating the termination of shutdown processing is received from the host 103 (procedure ②) the operation of the host UPS 101 is terminated (procedure ③).

The disk array UPS 102 monitors the host ac monitor line 108 or "TRM POWER-N" 204 to recognize the termination of the host UPS 101 or the host 103 itself. At recognition of the termination, the shutdown processing (programmed termination) of the disk array 104 is started (procedure ④). As in the case of the host UPS 101, when "OFFOK-N" 203 indicating the completion of the programmed termination is received from all disk arrays 104 connected to the ports (procedure ⑤), the operation of disk array UPS 102 is terminated (procedure ⑥).

Figure 4:
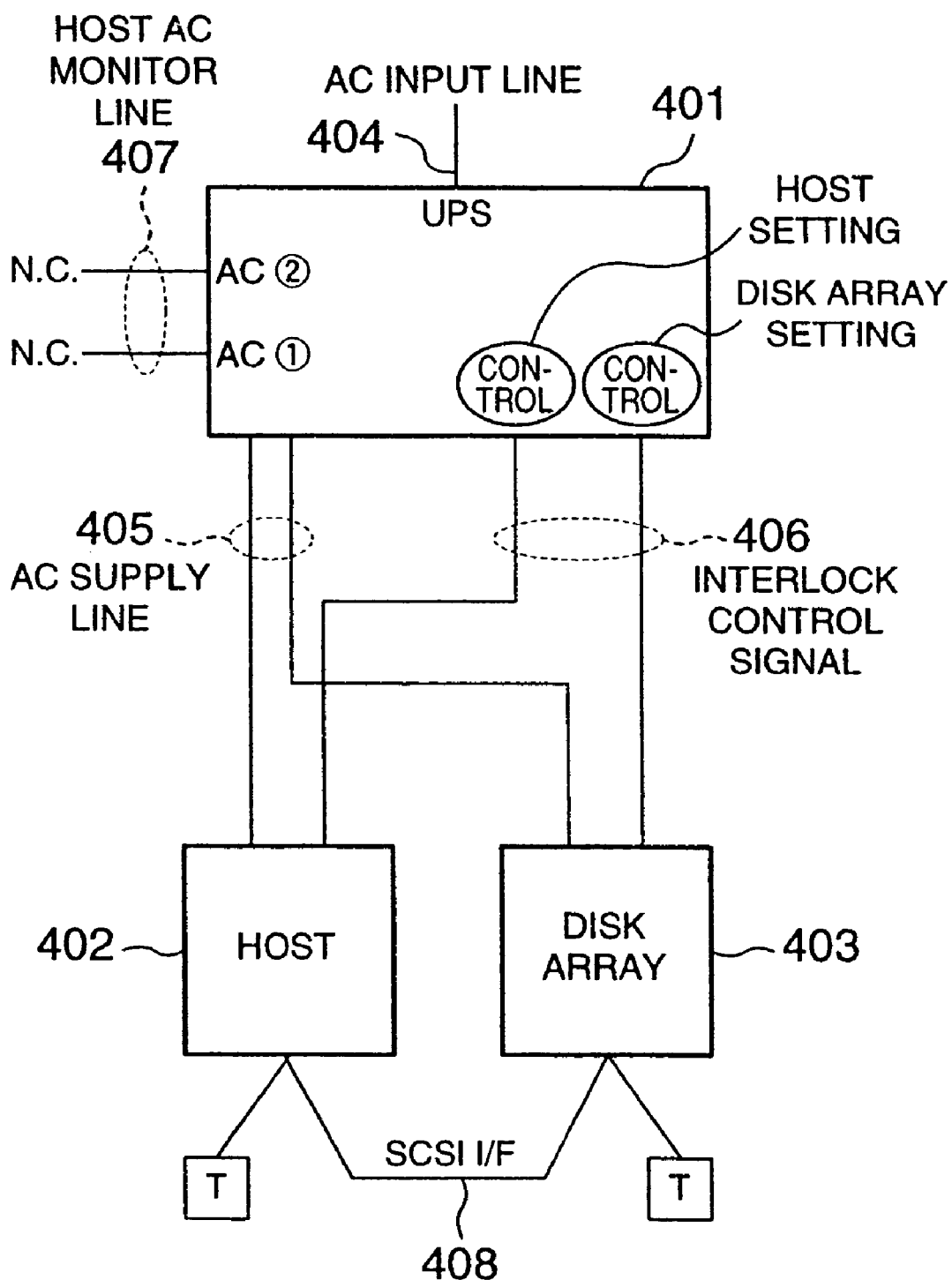
FIG. 4 is a diagram showing a configuration of another embodiment in accordance with the present invention.

FIG. 4 is a diagram showing a configuration of another embodiment in accordance with the present invention. In the configuration of this embodiment, only one UPS 401 is employed for the host and the disk array. The UPS 401 includes an ac input line 404 to supply power via ac supply lines 405 respectively to a host 402 (corresponding to the host 103 of FIG. 1) and a disk array 403. Moreover, between the UPS 401 and the host 402 and between the UPS 401 and the disk array 403, there is used an interlock control signal 406 to control operation therebetween. The host setting and the disk array setting are specified respectively for the side of port 1 and the side of port 2 which are connected to the host 402 and the disk array 403 respectively.

The host ac monitor line 407 is set to Disable such that the state of power of the host 402 is monitored by an SCSI I/F 408. The interlock control is basically the same as for the embodiment described above. However, this embodiment varies from the embodiment above only in that because the UPS 401 is connected not only to the host 402 but also to the disk array. That is, after the host 402 conducts the shutdown processing process goes to the processing to terminate the operation of disk array 403 (procedure ④) without executing the processing to stop the UPS 401 (procedure ③).

As described above, in accordance with the embodiments of the present invention, there are provided an interlock control method using signals to monitor various states between the host and the UPS and between the disk array and the UPS so as to control operation therebetween, a function for the disk array to recognize the state of power of the host by an existing SCSI I/F signal, and/or a function for the disk array UPS to recognize the power state of the host by sending a host ac line signal of the host UPS to the disk array UPS. Consequently, it is possible to automatically execute all processing of ① to ⑥ after a power failure.

Furthermore, since the host, the disk array, and the UPSs are interlockingly controlled, a sequence of operations including the initiation of the shutdown processing of the host at power failure, the shutdown processing (programmed termination) of the disk array after the shutdown of the host, and the power off processing of the UPS can be automatically conducted without any intervention of human power to thereby guarantee user data.

In addition, since operation between the disk array and the UPS and operation between the host and the UPS are interlockingly controlled in the same control method, it is possible to control both of the disk array and the host by the same UPS. This advantageously results in an interlock control method with wider usability for more generalized uses.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claim is:

1. An uninterruptible power supply (UPS) for supplying power to a disk array which includes a disk drive and a data cache and to a host, said UPS comprising:
    a first control port set for the disk array; and
    a second control port set for the host,
    wherein said first control port is coupled to the disk array and the second control port is coupled to the host,
    wherein said UPS supplies power to the disk array and the host, and
    wherein the UPS performs termination processing of the disk array and termination processing of the UPS after performing termination processing of the host and cache flush processing of the disk array.

2. The UPS according to claim 1, wherein the second control port can be changed between a setting for the disk array and a setting for the host.

3. An interlocking control method for use in an uninterruptible power supply (UPS) that supplies power to a disk array which includes a disk drive and a data cache and a host, said method comprising:
    performing termination processing of the host;
    performing cache flush processing of the disk array;
    performing termination processing of the disk array after performing the termination processing of the host and the cache flush processing of the disk array; and
    performing termination processing of the UPS.

4. An interlocking control method according to claim 3, wherein said performing termination processing of the host is performed in accordance with an interlocking signal from a second control port of the UPS set for the host.

5. An interlocking control method according to claim 3, wherein said performing cache flush processing of the disk array and said performing termination processing of the disk array are performed in accordance with an interlocking signal from a first control port of the UPS set for the disk array.

* * * * *